US007412224B2

(12) United States Patent
Kotola et al.

(10) Patent No.: US 7,412,224 B2
(45) Date of Patent: Aug. 12, 2008

(54) PORTABLE LOCAL SERVER WITH CONTEXT SENSING

(75) Inventors: Sakari Kotola, Kauniainen (FI); Teppo Savinen, Vihti (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/271,887

(22) Filed: Nov. 14, 2005

(65) Prior Publication Data

US 2007/0110010 A1    May 17, 2007

(51) Int. Cl.
*H04B 1/38* (2006.01)
(52) U.S. Cl. .............. 455/403; 455/411; 455/41.2; 455/3.01; 455/414.1; 370/338; 725/62; 348/14.01; 709/219
(58) Field of Classification Search ......... 455/418–420, 455/414.1, 41.1–41.2, 550.1, 552.1, 553.1, 455/3.01, 403, 422.1, 425, 556.1, 507, 517, 455/411; 340/10.1; 715/747; 704/104.1; 725/62–63, 81; 370/338, 328, 310–310.2; 348/14.01–14.02, 211.1–211.3; 709/203, 709/219, 231, 238
See application file for complete search history.

(56) References Cited

U.S. PATENT DOCUMENTS

| 6,957,393 | B2 * | 10/2005 | Fano et al. ................. 715/747 |
| 7,072,975 | B2 * | 7/2006 | Kato ........................... 709/237 |
| 7,145,437 | B2 * | 12/2006 | Jalkanen et al. ............. 455/41.1 |
| 7,162,451 | B2 * | 1/2007 | Berger et al. ................. 705/51 |
| 2001/0007815 | A1 * | 7/2001 | Philipsson .................... 455/41 |
| 2003/0008647 | A1 * | 1/2003 | Takatori et al. .............. 455/420 |
| 2003/0095791 | A1 * | 5/2003 | Barton et al. ................. 386/83 |
| 2005/0037787 | A1 * | 2/2005 | Bachner et al. ............. 455/502 |
| 2005/0130611 | A1 * | 6/2005 | Lu et al. ..................... 455/130 |
| 2005/0208892 | A1 * | 9/2005 | Kotola et al. ............... 455/41.2 |
| 2005/0219223 | A1 * | 10/2005 | Kotzin et al. ............... 345/173 |
| 2006/0047704 | A1 * | 3/2006 | Gopalakrishnan ........ 707/104.1 |
| 2006/0073788 | A1 * | 4/2006 | Halkka et al. ............. 455/41.2 |
| 2006/0090122 | A1 * | 4/2006 | Pyhalammi et al. ...... 715/500.1 |
| 2006/0090202 | A1 * | 4/2006 | Liu et al. ..................... 726/17 |
| 2006/0199533 | A1 * | 9/2006 | Zilliacus et al. ............ 455/41.2 |
| 2006/0221051 | A1 * | 10/2006 | Flynt et al. .................. 345/156 |
| 2006/0268896 | A1 | 11/2006 | Kotola et al. |
| 2007/0005605 | A1 * | 1/2007 | Hampton ..................... 707/10 |

(Continued)

FOREIGN PATENT DOCUMENTS

EP    1246487 A2    10/2002

(Continued)

OTHER PUBLICATIONS

European Search Report issued in corresponding Intl. Appln. No. PCT/IB2006/001247; 15 pgs. (Oct. 31, 2006).

*Primary Examiner*—William Trost
*Assistant Examiner*—Kamran Afshar
(74) *Attorney, Agent, or Firm*—Morgan & Finnegan, LLP

(57) ABSTRACT

A system for distributing information via short-range wireless communication. A mobile server receives information from an information provider for distribution to encountered devices. The information received from the service provider may contain both content to be distributed and context information that controls how the content is distributed. The mobile server may sense current environmental conditions, which are compared to distribution rules created from the context information to control how content information is distributed. The present invention is suitable for many applications, including the distribution of podcast-related information.

41 Claims, 13 Drawing Sheets

U.S. PATENT DOCUMENTS

2007/0027809 A1 * 2/2007 Alve .................. 705/51

FOREIGN PATENT DOCUMENTS

| EP | 1253540 | A2 | 10/2002 |
| EP | 1246487 | A3 | 5/2003 |
| EP | 1392023 | A2 | 2/2004 |
| EP | 1392023 | A3 | 6/2004 |
| GB | 2410153 | A | 7/2005 |
| JP | 2003016347 | A2 | 1/2003 |
| WO | WO 2006/092688 | A2 | 9/2006 |

* cited by examiner

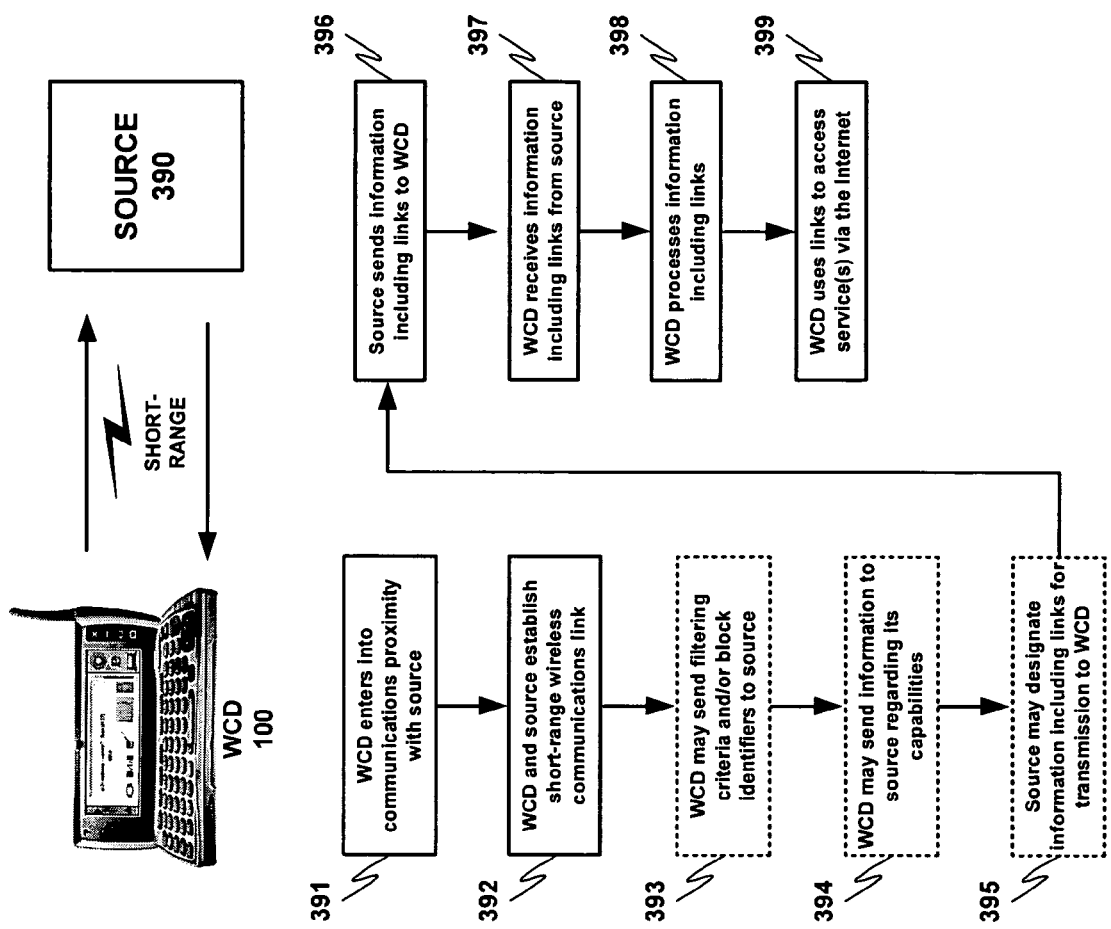

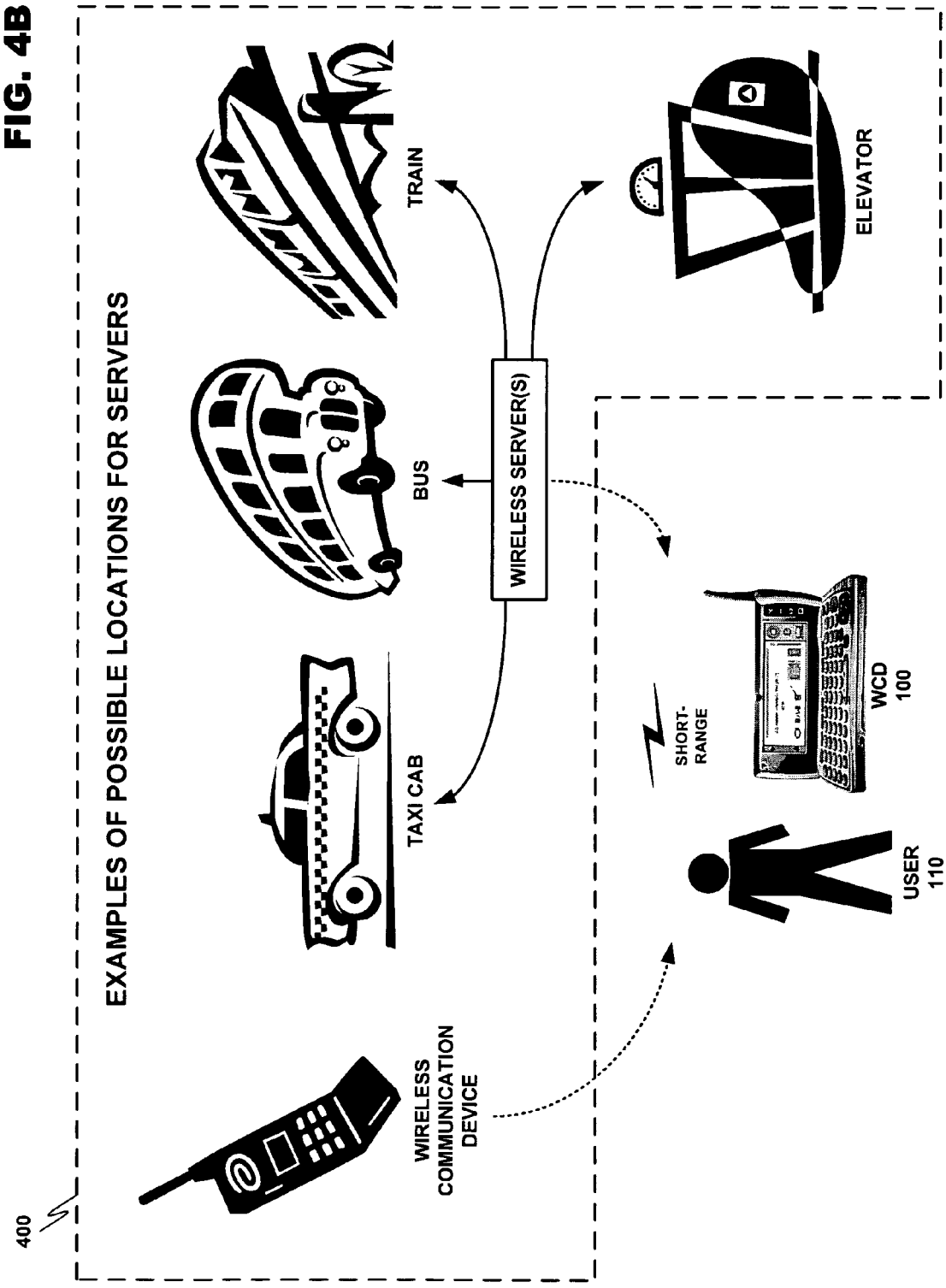

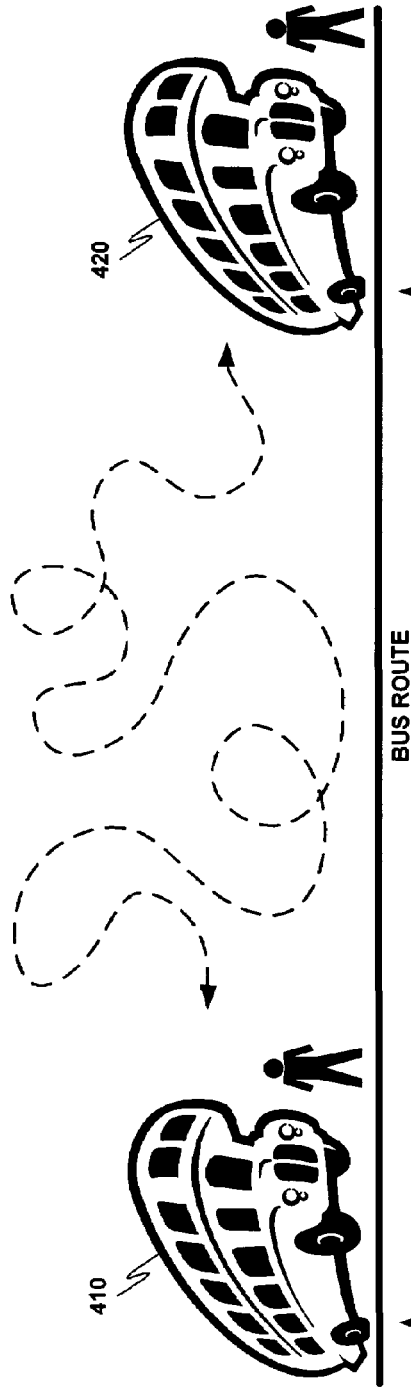

FIG. 4C

EXAMPLE SENSED CONTEXT:

TIME: AFTERNOON
LOCATION: CITY
COMMUTERS: MIXED INTEREST

EXAMPLE SERVED CONTENT:

BUS SCHEDULE NOTIFICATIONS
LUNCH AND DINNER COUPONS
CITY SPECIAL EVENT SCHEDULE
WEATHER INFORMATION
AVAILABILITY OF VARIOUS PODCASTS

EXAMPLE SENSED CONTEXT:

TIME: EARLY MORNING
LOCATION: EASTERN SUBURBS OF CITY
COMMUTERS: PROFESSIONAL INTEREST

EXAMPLE SERVED CONTENT:

BUS SCHEDULE NOTIFICATIONS
BREAKFAST COUPONS
OFFICE SUPPLY SPECIALS
WEATHER INFORMATION
AVAILABILITY OF FINANCIAL PODCASTS

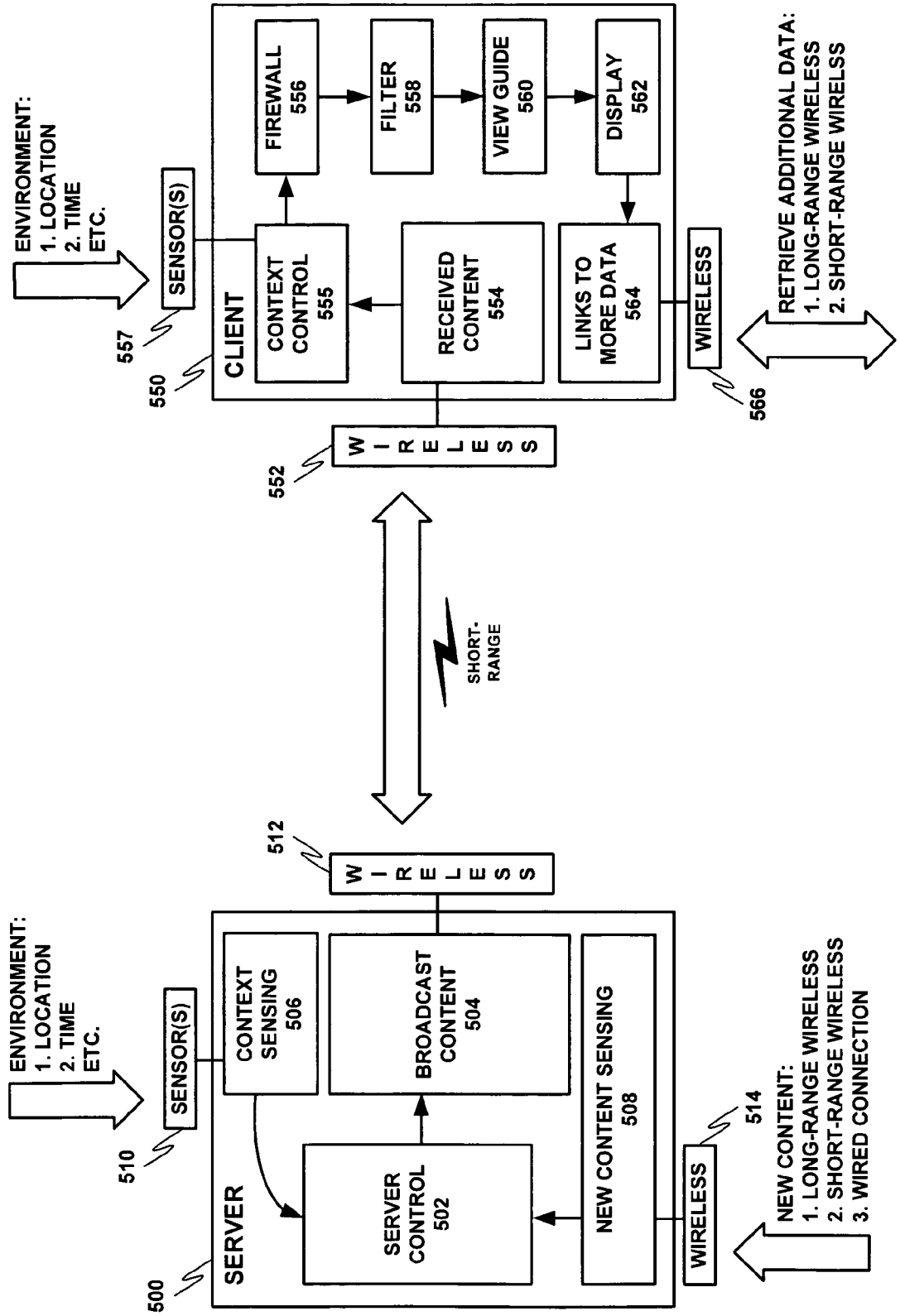

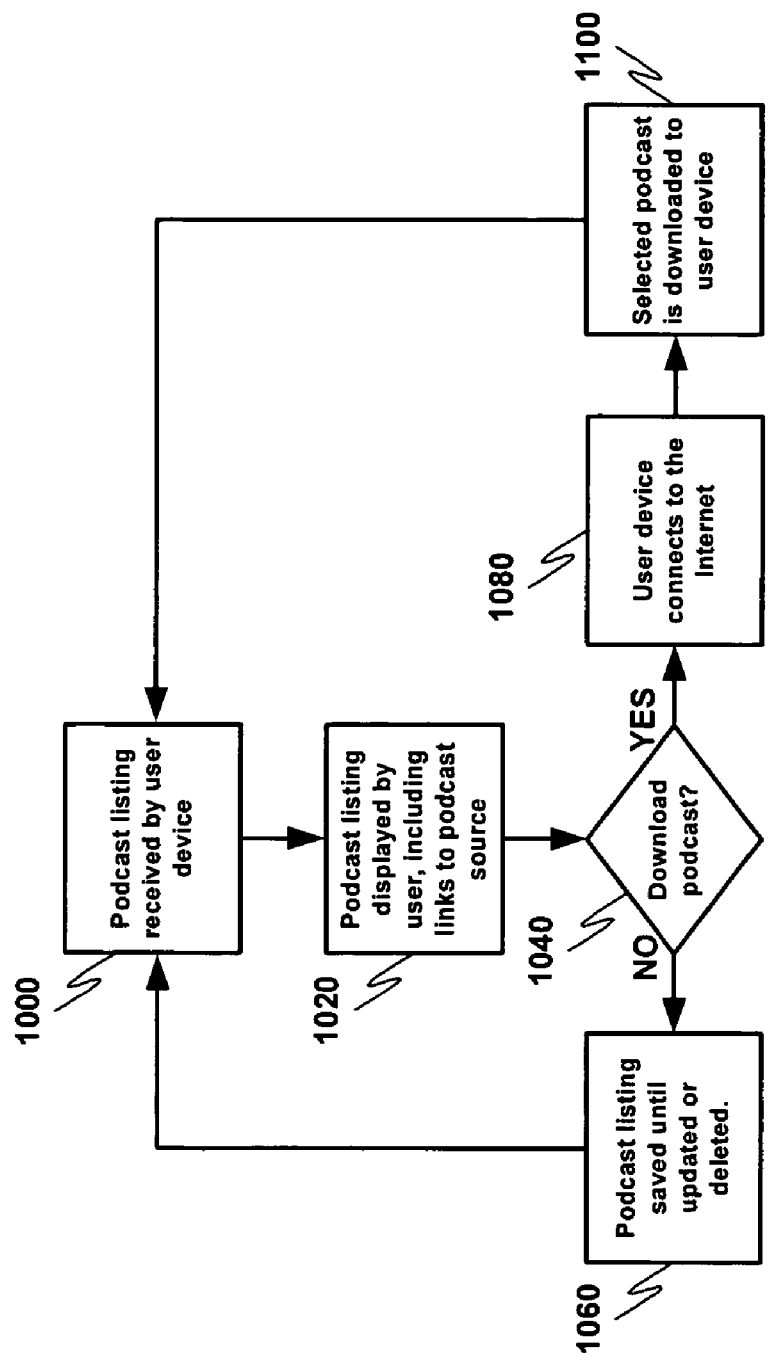

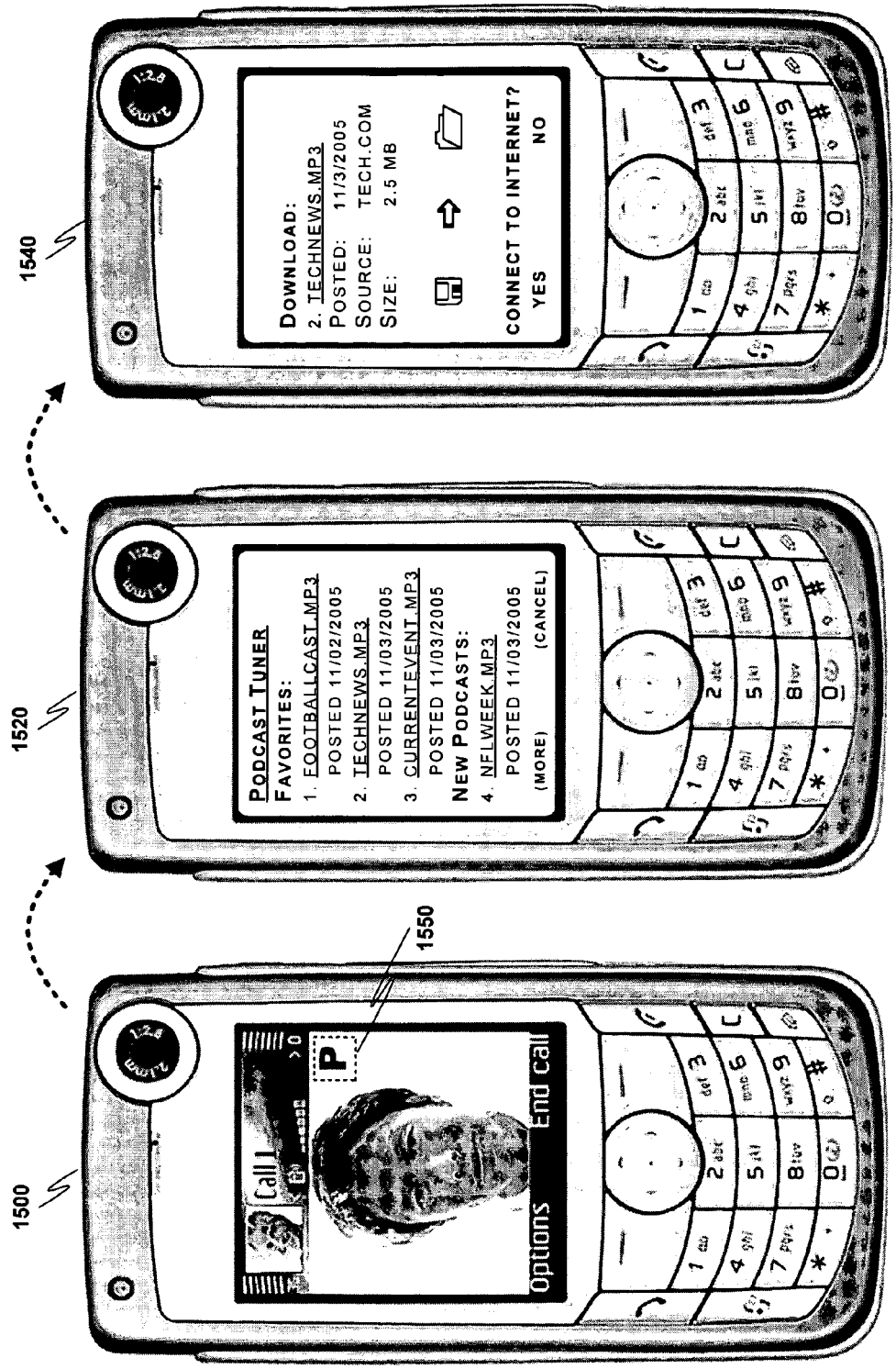

PORTABLE LOCAL SERVER WITH CONTEXT SENSING

BACKGROUND OF INVENTION

1. Field of Invention

The present invention relates to a system for delivering information to a device via wireless communication, and more specifically, to mobile server systems for distributing context-sensitive information to targeted consumer via short-range wireless communication.

2. Description of Prior Art

Modern society has quickly adopted, and become reliant upon, handheld devices for wireless communication. For example, cellular telephones continue to proliferate in the global marketplace due to technological improvements in both the quality of the communication and the functionality of the devices. These wireless communication devices (WCDs) have become commonplace for both personal and business use, allowing users to transmit and receive voice, text and graphical data from a multitude of geographical locations. The communication networks utilized by these devices span different frequencies and cover different broadcast distances, each having strengths desirable for various applications.

Cellular networks facilitate WCD communication over large geographic areas. These network technologies have commonly been divided by generations, starting in the late 1970s to early 1980s with first generation (1G) analog cellular telephones that provided baseline voice communications, to the now emerging 4G streaming digital video content planned for the 2006-2007 timeframe. GSM is an example of a widely employed 2G digital cellular network communicating in the 900 MHZ-1.8 GHZ band in Europe and at 1.9 GHZ in the United States. This network provides voice communication and also supports the transmission of textual data via the Short Messaging Service (SMS). SMS allows a WCD to transmit and receive text messages of up to 160 characters, while providing data transfer to packet networks, ISDN and POTS users at 9.6 Kbps. The Multimedia Messaging Service (MMS), an enhanced messaging system allowing for the transmission of sound, graphics and video files in addition to simple text, has also become available in certain devices. Soon emerging technologies such as Digital Video Broadcasting for Handheld Devices (DVB-H) will make streaming digital video, and other similar content, available via direct broadcast to a WCD. While long-range communication networks like GSM are a well-accepted means for transmitting and receiving data, due to cost, traffic and legislative concerns, these networks may not be appropriate for all data applications.

Short-range wireless networks provide communication solutions that avoid some of the problems seen in large cellular networks. Bluetooth™ is an example of a short-range wireless technology quickly gaining acceptance in the marketplace. A Bluetooth™ enabled WCD transmits and receives data at a rate of 720 Kbps within a range of 10 meters, and may transmit up to 100 meters with additional power boosting. A user does not actively instigate a Bluetooth™ network. Instead, a plurality of devices within operating range of each other will automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master, and wait for an active slot to become available. These devices continually switch between various active communication and power saving modes in order to transmit data to other piconet members.

More recently, manufacturers have also began to incorporate various resources for providing enhanced functionality in WCDs (e.g., components and software for performing close-proximity wireless information exchanges). Sensors and/or scanners may be used to read visual or electronic information into a device. A transaction may involve a user holding their WCD in proximity to a target, aiming their WCD at an object (e.g., to take a picture) or sweeping the device over a printed tag or document. Machine-readable technologies such as radio frequency identification (RFID), Infra-red (IR) communication, optical character recognition (OCR) and various other types of visual, electronic and magnetic scanning are used to quickly input desired information into the WCD without the need for manual entry by a user.

The proliferation of wireless communication technology means that users have the ability to communicate without being restricted by time or location. This accessibility has created a desire for information providers (e.g., business, educational institutions, government, etc.) to tap into this potential. Currently, not only can a targeted consumer see a printed advertisement at a location (e.g., store, restaurant, mall, bus stop, train station, etc.), but at that moment when the user's interest is peaked, the user has the ability to employ their WCD to contact the advertised business to obtain more information, place an order, enroll in a service plan, etc. Advertisers have attempted to facilitate this reaction by including machine-readable sources of information in close proximity to the visual advertisements. In these situations, a user may download information relevant to the visual indicia from the source via short-range communication. This information, may contain links to an Internet website, contact information (e.g., telephone numbers, email addresses, etc.), or other information of further interest to a user.

As the amount of information available for immediate download rapidly increases, the information providers risk the target audience for this information becoming overwhelmed equally as quickly. The main content of the information provided must be usable (e.g., timely, location-specific, unexpired, etc.) and of interest to the consumer. Otherwise, people may revolt against the information providers by instituting measures to screen these transactions from receipt on their WCDs. These blocking measures may include filtering software to prevent the download of certain information, or in the extreme, the prevention of all short-range communications. These actions hurt both the information provider and the user. If the information providers cannot profit from innovations related to the offering of new services to a consumer, they may reduce resources spent on developing new technologies and services. The consumer will in turn lose the benefits they might experience through the use of these emerging services. In at least one example, these services might include the mobile distribution of information related to podcasts, which are pre-recorded audio broadcasts syndicated over the Internet. These audio presentations are gaining a large audience, and a mobile service that delivers podcast related information directly to a consumer, allowing a user to both locate and download a podcast directly to their WCD, would fill a much needed hole in the marketplace.

Therefore, what is needed is a system for enabling a server device to wirelessly distribute information desired by a large target audience. These server devices should be mobile, and able to control the information distributed in regard to an environmental context. A receiving device, possibly also including context-sensitive control, may then contact, or be contacted by, the serving device in order to receive the distributed information via wireless transfer. Further, the wireless distribution of audio and video information available over the Internet, for example, the distribution of podcast information, would be desirable in order to proliferate mobile access to various types of multimedia data, which improves the flexibility for consumers to informed about newly available desired content that may be obtained immediately.

SUMMARY OF INVENTION

The present invention includes various embodiments related to a method, apparatus, server, computer program and system for distributing information via short-range wireless communication to a client device from a mobile information server. The information may include the content to be delivered to a user, with distribution controlled by various context rules that may also be included in the information. A client or terminal device may, after receiving information from a server, screen or filter the information to determine if the content is related to something of interest to the user, and may use this information to seek further information when an Internet connection is available to (or convenient for) the user.

The mobile server may include context control that compares a sensed condition in the environment to various context rules. These context rules may be a combination of rules already present in the serving device and rules set forth in the actual content. The context rules may govern the identity of the particular content to be distributed, the geographic area in which the content should be distributed, the times (or times of day) when the content should be distributed, a date when distribution should be continued (or discontinued), a weather classification dictating when content should be distributed (e.g., sunny, rainy, hot, cold, etc.), a device identification indicating the certain devices to which to distribute information based on manufacturer, service provider, a user indicated category identifier, etc. A client device may likewise include a similar context control that governs whether information broadcast by the mobile server may be accepted for download.

In at least one embodiment of the present invention, information pertaining to the availability of podcasts is wirelessly distributed. A consolidation provider (e.g., a website) may gather information concerning the availability of new podcast content for upload to the mobile server device. This information may be manually or automatically uploaded to a mobile server device as a podcast listing via either a wired or wireless connection. The server device will distribute the podcast availability information based on various context rules via short-range wireless communication to information consumers. These recipients may use a podcast tuner, a podcast receiver or similar software installed in their WCD to organize and review the information about new podcast content, and may in turn use this received information to connect to the Internet in order to download a desired podcast.

DESCRIPTION OF DRAWINGS

The invention will be further understood from the following detailed description of a preferred embodiment, taken in conjunction with appended drawings, in which:

FIG. 4A discloses an exemplary wireless data transfer process in accordance with at least one embodiment of the present invention.

FIG. 4B discloses examples of various mobile wireless information servers in accordance with at least one embodiment of the present invention.

FIG. 4C discloses an example of a mobile wireless information server sensing and reacting to environmental conditions as dictated by context rules in accordance with at least one embodiment of the present invention.

FIG. 5 discloses an exemplary server device and client device usable in at least one embodiment of the present invention.

FIG. 10A discloses a flowchart explaining an exemplary embodiment of the present invention, wherein a user selects and downloads a podcast based on information received from a server device.

FIG. 10B discloses a variety of exemplary user interfaces in accordance with at least one embodiment of the present invention.

DESCRIPTION OF PREFERRED EMBODIMENT

While the invention has been described in preferred embodiments, various changes can be made therein without departing from the spirit and scope of the invention, as described in the appended claims.

I. Wireless Communication Over Different Communication Networks.

Figure 1:
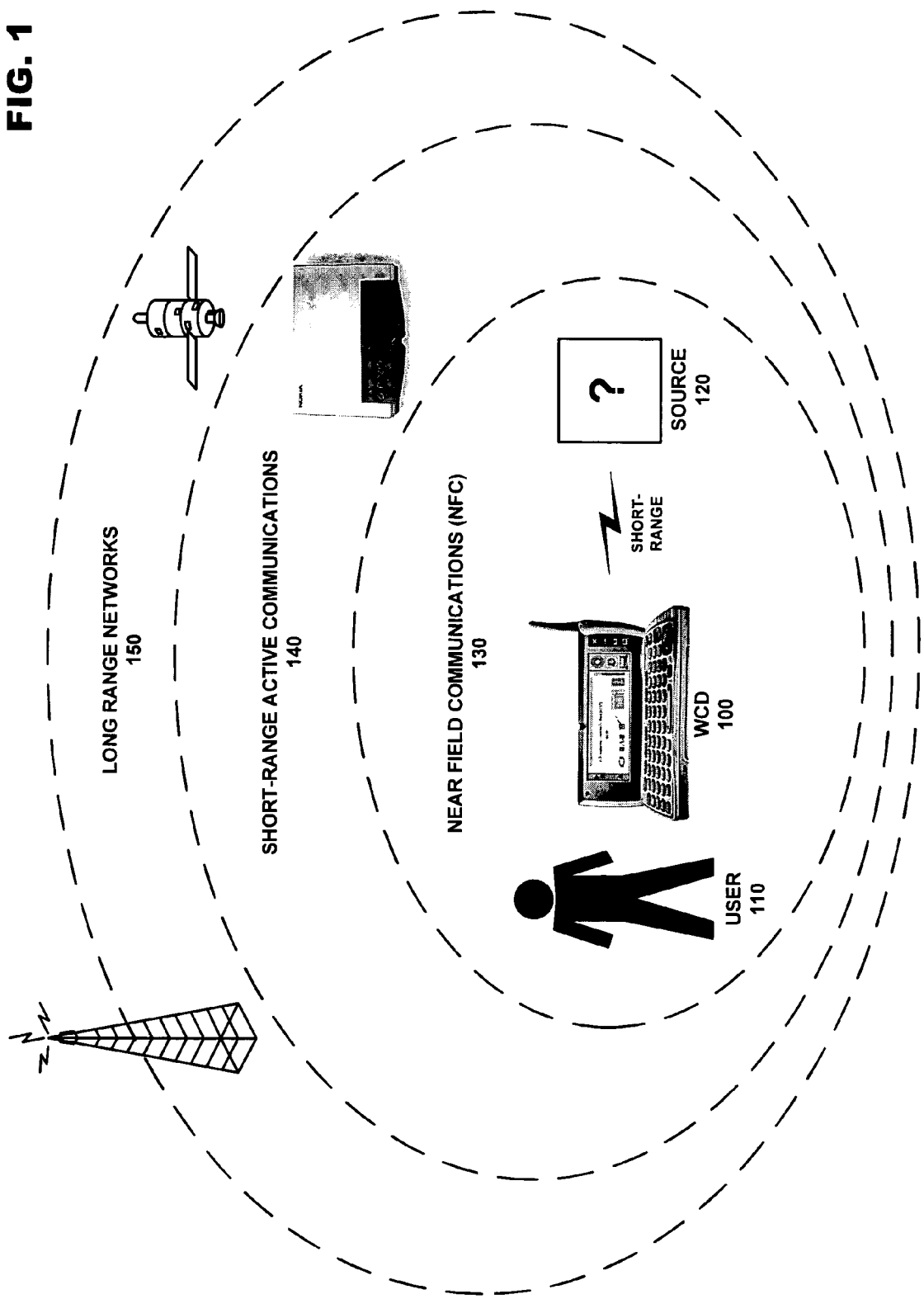
FIG. 1 discloses an exemplary short-range to long-range wireless communication scenario in accordance with at least one embodiment of the present invention.

A WCD may both transmit and receive information over a wide array of wireless communication networks, each with different speed, range, quality (error correction), security (encoding), etc. characteristics. These characteristics will dictate the amount of information that may be transferred to a receiving device, and the duration of the information transfer. FIG. 1 includes a diagram of a WCD and how it interacts with various types of wireless networks.

In the example pictured in FIG. 1, user 110 possesses WCD 100. This device may be anything from a basic cellular handset to a more complex device such as a wirelessly enabled palmtop or laptop computer. Near Field Communications (NFC) 130 include various transponder-type interactions wherein normally only the scanning device requires its own power source. WCD 100 scans source 120 via short-range communications. A transponder in source 120 may use the energy and/or clock signal contained within the scanning signal, as in the case of RFID communication, to respond with data stored in the transponder. These types of technologies usually have an effective transmission range of a few inches to a few feet, and may be able to deliver stored data in amounts from 96 bits to over a megabit (or 125 Kbytes) relatively quickly. These characteristics make these technologies well suited for identification purposes, such as to receive an account number for a public transportation provider, a key code for an automatic electronic door lock, an account number for a credit or debit transaction, etc.

The transmission range between two devices may be extended if both devices are capable of performing powered communications. Short-range active communications 140 includes devices wherein the sending and receiving devices are both active. An exemplary situation would include user 110 coming within effective transmission range of a Bluetooth™, WLAN, UWB, WUSB, etc. access point. In the case of Bluetooth™, a network may automatically be established to transmit information to WCD 100 possessed by user 110. This data may include information of an informative, educational or entertaining nature. The amount of information to be conveyed is unlimited, except that it must all be transferred in the time when user 110 is within effective transmission range of the access point. This duration is extremely limited if the user is, for example, strolling through a shopping mall or walking down a street. Due to the higher complexity of these networks, additional time is also required to establish the initial connection to WCD 100, which is extended if there are many devices queued for service in the transmission area. The transmission range of these networks depends on the technology, and may be from 32 ft. to over 300 ft. with additional power boosting.

Long-range networks 150 are used to provide virtually uninterrupted communications coverage for WCD 100. Land-based radio stations or satellites are used to relay various communications transactions worldwide. While these systems are extremely functional, the use of these systems are often charged on a per-minute basis to user 110, not including additional charges for data transfer (e.g., wireless Internet access). Further, the regulations covering these systems cause additional overhead for both the users and providers, making the use of these systems more cumbersome.

II. Wireless Communication Device

As previously described, the present invention may be implemented using a variety of wireless communication equipment. Therefore, it is important to understand the communication tools available to user 110 before exploring the present invention. For example, in the case of a cellular telephone or other handheld wireless device, the integrated data handling capabilities of the device play an important role in facilitating transactions between the transmitting and receiving devices.

Figure 2:
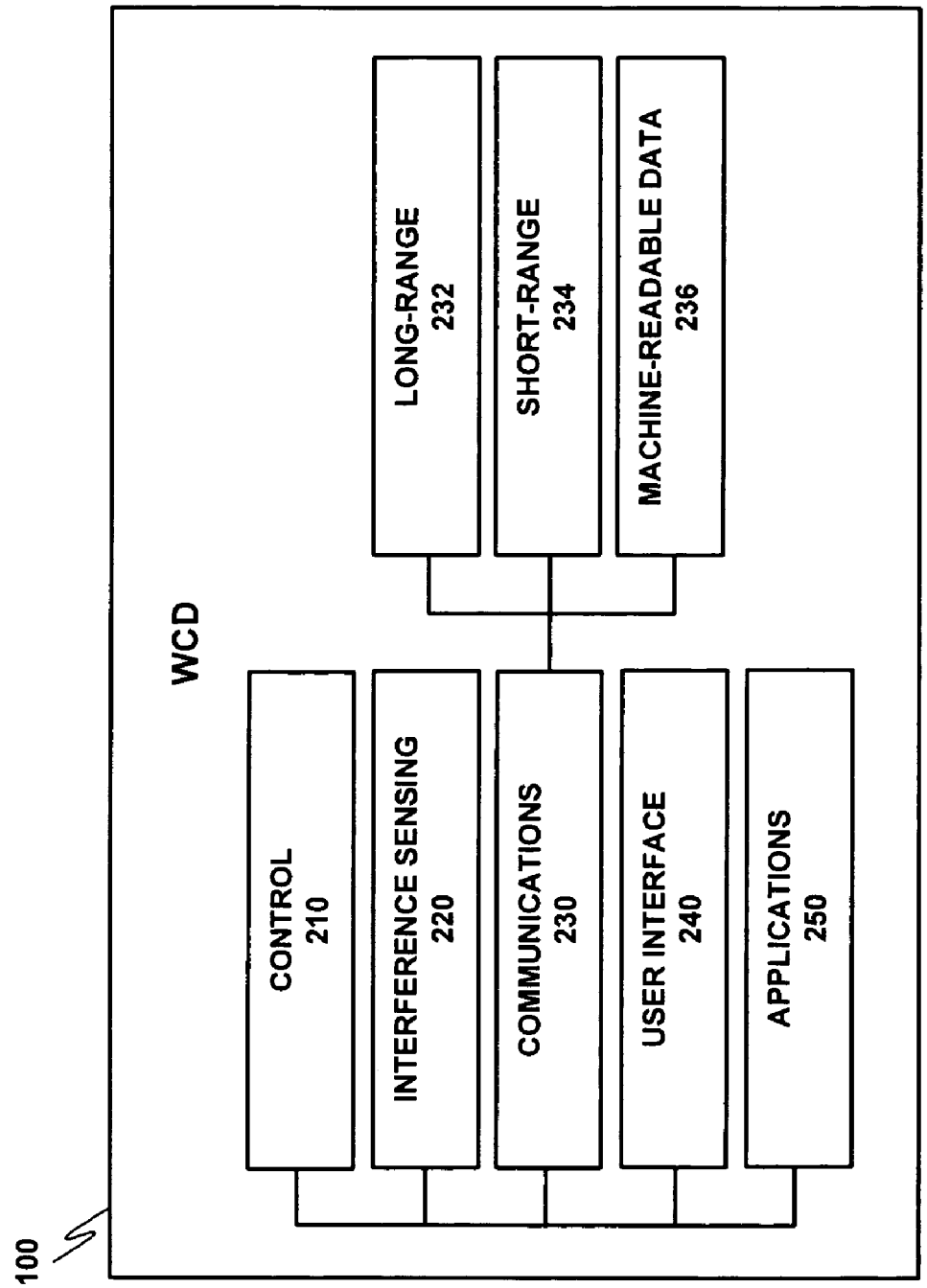
FIG. 2 discloses a modular description of an exemplary wireless communication device usable with at least one embodiment of the present invention.

FIG. 2 discloses an exemplary modular layout for a wireless communication device usable with the present invention. WCD 100 is broken down into modules representing the functional aspects of the device. These functions may be performed by the various combinations of software and/or hardware components discussed below.

Control module 210 regulates the operation of the device. Inputs may be received from various other modules included within WCD 100. For example, interference sensing module 220 may use various techniques known in the art to sense sources of environmental interference within the effective transmission range of the wireless communication device. Control module 210 interprets these data inputs and in response may issue control commands to the other modules in WCD 100.

Communications module 230 incorporates all of the communications aspects of WCD 100. As shown in FIG. 2, communications module 230 includes, for example, long-range communications module 232, short-range communications module 234 and machine-readable data module 236. Communications module 230 utilizes at least these sub-modules to receive a multitude of different types of communication from both local and long distance sources, and to transmit data to recipient devices within the broadcast range of WCD 100. Communications module 230 may be triggered by control module 210 or by control resources local to the module responding to sensed messages, environmental influences and/or other devices in proximity to WCD 100.

User interface module 240 includes visual, audible and tactile elements which allow the user 110 to receive data from, and enter data into, the device. The data entered by user 110 may be interpreted by control module 210 to affect the behavior of WCD 100. User-inputted data may also be transmitted by communications module 230 to other devices within effective transmission range. Other devices in transmission range may also send information to WCD 100 via communications module 230, and control module 210 may cause this information to be transferred to user interface module 240 for presentment to the user.

Applications module 250 incorporates all other hardware and/or software applications on WCD 100. These applications may include sensors, interfaces, utilities, interpreters, data applications, etc., and may be invoked by control module 210 to read information provided by the various modules and in turn supply information to requesting modules in WCD 100.

Figure 3:
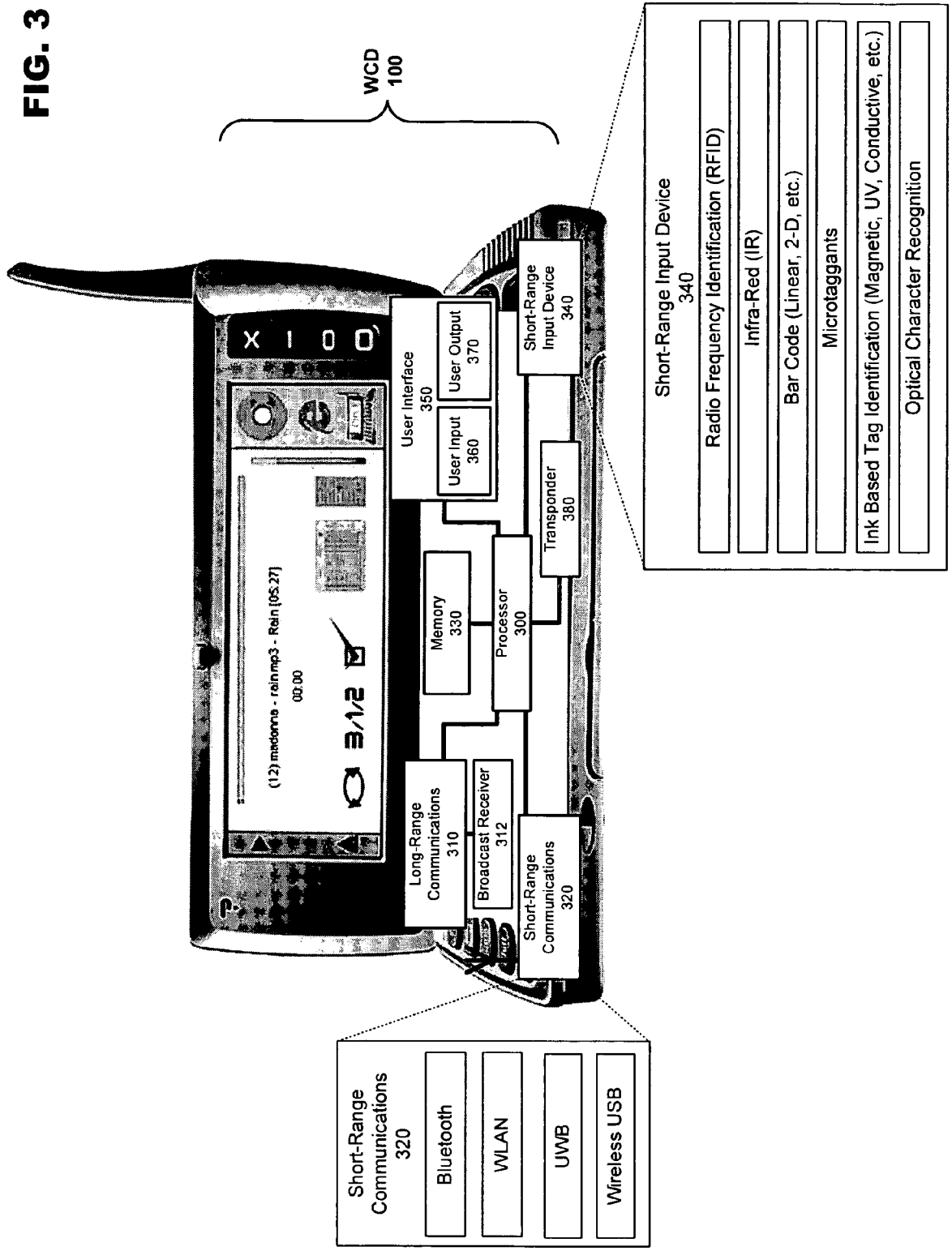
FIG. 3 discloses a structural description of the exemplary wireless communication device previously described in FIG. 2.

FIG. 3 discloses an exemplary structural layout of WCD 100 according to an embodiment of the present invention that may be used to implement the functionality of the modular system previously described in FIG. 2. Processor 300 controls overall device operation. As shown in FIG. 3, processor 300 is coupled to communications sections 310, 320 and 340. Processor 300 may be implemented with one or more microprocessors that are each capable of executing software instructions stored in memory 330.

Memory 330, on which computer-executable program code may be embedded to yield an exemplary computer program product, may include random access memory (RAM), read only memory (ROM), and/or flash memory, and stores information in the form of data and software components (also referred to herein as modules). The data stored by memory 330 may be associated with particular software components. In addition, this data may be associated with databases, such as a bookmark database or a business database for scheduling, email, etc.

The software components stored by memory 330 include instructions that can be executed by processor 300. Various types of software components may be stored in memory 330. For instance, memory 330 may store software components that control the operation of communication sections 310, 320 and 340. Memory 330 may also store software components including a firewall, a service guide manager, a bookmark database, user interface manager, and any communications utilities modules required to support WCD 100.

Long-range communications 310 performs functions related to the exchange of information over large geographic areas (such as cellular networks) via an antenna. These communication methods include technologies from the previously described 1G to 3G and soon fourth generation streaming video transmission. In addition to basic voice communications (e.g., via GSM), long-range communications 310 may operate to establish data communications sessions, such as General Packet Radio Service (GPRS) sessions and/or Universal Mobile Telecommunications System (UMTS) sessions. Also, long-range communications 310 may operate to transmit and receive messages, such as short messaging service (SMS) messages and/or multimedia messaging service (MMS) messages.

As a subset of long-range communications 310, or alternatively operating as an independent module separately connected to processor 300 (not pictured), broadcast receiver 312 allows WCD 100 to receive broadcast messages via mediums such as Digital Video Broadcast for Handheld Devices (DVB-H). These transmissions may be encoded so that only certain designated receiving devices may access the broadcast content, and may contain text, audio or video information. In at least one example, WCD 100 may receive these broadcasts and use information contained within the broadcast signal to determine if the device is permitted to view the received content.

Short-range communications 320 is responsible for functions involving the exchange of information across short-range wireless networks. As described above and depicted in FIG. 3, examples of such short-range communications 320 are not limited to Bluetooth™, WLAN, UWB and Wireless USB connections. Accordingly, short-range communications 320 performs functions related to the establishment of short-range connections, as well as processing related to the transmission and reception of information via such connections.

Short-range input device 340, also depicted in FIG. 3, may provide functionality related to the short-range scanning of machine-readable data. For example, processor 300 may control short-range input device 340 to generate RF signals for activating an RFID transponder, and may in turn control the reception of signals from an RFID transponder. Other short-range scanning methods for reading machine-readable data that may be supported by the short-range input device 340 are not limited to IR communications, linear and 2-D (e.g., QR) bar code readers (including processes related to interpreting UPC labels), and optical character recognition devices for reading magnetic, UV, conductive or other types of coded data that may be provided in a tag using suitable ink. In order for the short-range input device 340 to scan the aforementioned types of machine-readable data, the input device may include optical detectors, magnetic detectors, CCDs or other sensors known in the art for interpreting machine-readable information.

As further shown in FIG. 3, user interface 350 is also coupled to processor 300. User interface 350 facilitates the exchange of information with a user. FIG. 3 shows that user interface 350 includes a user input 360 and a user output 370. User input 360 may include one or more components that allow a user to input information. Examples of such components include keypads, touch screens, and microphones. User output 370 allows a user to receive information from the device. Thus, user output portion 370 may include various components, such as a display, light emitting diodes (LED), tactile emitters and one or more audio speakers. Exemplary displays include liquid crystal displays (LCDs), and other video displays.

WCD 100 may also include one or more transponders 380. This is essentially a passive device which may be programmed by processor 300 with information to be delivered in response to a scan from an outside source. For example, an RFID scanner mounted in a entryway may continuously emit radio frequency waves. When a person with a device containing transponder 380 walks through the door, the transponder is energized and may respond with information identifying the device, the person, etc.

Hardware corresponding to communications sections 310, 312, 320 and 340 provide for the transmission and reception of signals. Accordingly, these portions may include components (e.g., electronics) that perform functions, such as modulation, demodulation, amplification, and filtering. These portions may be locally controlled, or controlled by processor 300 in accordance with software communications components stored in memory 330.

The elements shown in FIG. 3 may be constituted and coupled according to various techniques in order to produce the functionality described in FIG. 2. One such technique involves coupling separate hardware components corresponding to processor 300, communications sections 310, 312 and 320, memory 330, short-range input device 340, user interface 350, transponder 380, etc. through one or more bus interfaces. Alternatively, any and/or all of the individual components may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 350 may interact with a communications utilities software component, also contained in memory 330, which provides for the establishment of service sessions using long-range communications 310 and/or short-range communications 320. The communications utilities component may include various routines that allow the reception of services from remote devices according to mediums such as the Wireless Application Medium (WAP), Hypertext Markup Language (HTML) variants like Compact HTML (CHTML), etc.

When engaging in WAP communications with a remote server, the device functions as a WAP client. To provide this functionality, the software components may include WAP client software components, such as a Wireless Markup Language (WML) Browser, a WMLScript engine, a Push Subsystem, and a Wireless Medium Stack.

Applications (not shown) may interact with the WAP client software to provide a variety of communications services. Examples of such communications services include the reception of Internet-based content, such as headline news, exchange rates, sports results, stock quotes, weather forecasts, multilingual phrase dictionaries, shopping and dining information, local transit (e.g., bus, train, and/or subway) schedules, personal online calendars, and online travel and banking services.

The WAP-enabled device may access small files called decks which each include smaller pages called cards. Cards are small enough to fit into a small display area that is referred to herein as a microbrowser. The small size of the microbrowser and the small file sizes are suitable for accommodating low memory devices and low-bandwidth communications constraints imposed by wireless links.

Cards are written in the Wireless Markup Language (WML), which is specifically devised for small screens and one-hand navigation without a keyboard. WML is scaleable so that it is compatible with a wide range of displays that covers two-line text displays, as well as large LCD screens found on devices, such as smart phones, PDAs, and personal communicators. WML cards may include programs written in WMLScript, which is similar to JavaScript. However, through the elimination of several unnecessary functions found in these other scripting languages, WMLScript reduces memory and processing demands.

CHTML is a subset of the standard HTML command set adapted for use with small computing devices (e.g., mobile communicator, PDA, etc.). This language allows portable or handheld devices interact more freely on the Internet. CHTML takes into consideration the power, processing, memory and display limitations of small computing devices by stripping down standard HTML to a streamlined version suitable for these constraints. For example, many of the more advanced image maps, backgrounds, fonts, frames, and support for JPEG images have been eliminated. Further, scrolling is not supported because it is assumed that CHTML displays will fit within the screen of a portable device. CHTML has also been designed to operated without two dimensional cursor movement. Instead, it may be manipulated with only four buttons, which facilitates its implementation over a larger category of small computing devices.

III. Wireless Information Servers and Clients

Various embodiments of the present invention utilize information servers to wirelessly distribute information to user 110. These information servers may be stationary, but are preferably mobile and context-aware, in order to increase beneficial interaction with a variety of information consumers. FIG. 4A sets forth an exemplary wireless data transaction between a WCD 100 and a source 390 that provides a basis from which to explain further embodiments of the present invention.

In FIG. 4A, WCD 100 and source 390 participate a wireless communication transaction. In step 391, WCD 100 comes into proximity of source 390. The effective communications range of source 390 depends on the medium of communication in use. For example, if source 390 is a bar code to be read by an optical scanner in WCD 100, the effective communication range may be only a few inches. Alternatively, the range would be much larger if a short-range wireless technology like Bluetooth™ is employed as the communication medium. After WCD 100 and source 390 establish communications in step 392, some optional steps may occur depending on the sophistication of source 390. If source 390 is, for example, a Bluetooth™ access point, then WCD 100 may initially transmit to source 390 information such as filtering criteria (e.g., the category or subject matter of content WCD 100 is permitted to download), block identifiers and/or capability information regarding the types of information WCD 100 is equipped to handle (steps 393 and 394). Source 390 may use this information, in step 395, to designate specific information for transfer to WCD 100. The information deemed appropriate for WCD 100 is then transferred from the source in step 396. This transfer may occur via any of the NFC or short-range active communication methods previously described. The received information (step 397) is then processed by WCD 100 in step 398. This processing may entail, for example, checking the received information for errors and/or viruses, additional information filtering, sorting the received information (by category, user preference, etc.), formatting the received information for display on WCD 100, etc. The received information may also contain pointers, service bookmarks, hyperlinks, etc. (hereafter generally referred to as "links" in this disclosure) that point to other sources of information available via connection to another source. In step 399, WCD 100 may then connect to another source, such as the Internet, to download the additional information designated by the links contained in the information originally received from source 390.

FIG. 4B discloses various examples of locations for wireless communication servers usable with various embodiments the present invention. The wireless communication servers usable with the various locations set forth in examples 400 may include standard wireless communication devices acting as servers, and installed devices dedicated only to distributing information. An exemplary standard wireless communication device may be as simple as the cellular handset shown in examples 400. This device may receive information from an information provider with instructions to share the information with newly discovered devices via short-range wireless communication. The original information provider may be a short-range wireless access point or another cellular device. In this manner, information may be passed from one user to another exponentially in order to propagate content that may be desired by user 110.

In another embodiment, a dedicated information server may be installed in a place frequented by users who may be interested in receiving information from a particular information provider. An example of a location for installation 400 is a commuter vehicle including, but not limited to taxi cabs, buses, trains and elevators. The communication servers may be mounted within and powered by these vehicles. Riders may receive information via short-range wireless communication during their trip, and passersby outside the vehicle may receive information when the vehicle is stopped, for example, at a traffic light.

Since these vehicles are constantly moving, a context sensitive server may be employed to control the distribution of information relative to the sensed environment. An exemplary application of such control is shown in FIG. 4C. A commuter bus starts at point 410 and follows a set bus route to point 420 where in may turn around and repeat the path in reverse. An example context is sensed at point 410. The current time is sometime in the early morning, the location is the eastern suburbs of the city, and the commuters have interests that are professional (e.g., the commuters are professionals on their way to work). The interest context may be determined by communicating with a sample of devices in the area to determine the subject matter interests of various users, or alternatively by a pre-programmed table or database describing an interest through a relationship between various other sensed conditions. The context control of the information server then selects information appropriate for the sensed situation. The information may include, but is not limited to, bus schedule notifications, breakfast coupons, business related information such as office supply specials, weather information, availability of podcasts related to financial subjects, etc.

Later in the day the bus arrives at point 420. The context has now changed. The information server senses that the time is sometime in the afternoon, the current location is in the city, and the people currently riding the bus have mixed interests. The information server may then alter the content being distributed according to this updated context. New content may include bus schedule notifications, lunch and dinner coupons, city special event schedules, weather information and the availability of a variety of informational and entertainment related podcasts. Of course, these examples are only meant to show that the information served may be altered by sensed context. The distributed information and the context control may be totally customized on an ongoing basis by an information provider.

IV. Information Server and Client Device

FIG. 5 discloses a functional diagram of an exemplary information server and client device in accordance with at least one embodiment of the present invention. Information server 500 may include all of the basic elements of a WCD previously discussed in FIG. 2-3, which are employed to embody the functional elements now described for server 500. Server 500 includes a server control 502 which controls the content to be broadcast 504. Server control 502 determines the content information 504 to be distributed based on input received from context sensing 506 and new content sensing 508.

Context sensing 506 may be coupled to various inputs or sensors 510 that determine the current condition or environment of server 500. These inputs or sensors may determine the current location of the server, the current time, the current date, the current weather or temperature, information regarding the number of other devices in transmission range of server 500, interest information obtained from other devices in transmission range of server 500, information from installation location 400 (e.g., the floor number selected in an elevator), the current memory state or power level of the server device, etc. This information is collected, and may be compiled, by context sensing 506 before being provided to server control 502. Other environmental factors may be sensed depending on the control requirements of server 500, the sensing abilities of the server 500, and the subject matter of the content to be broadcast.

New content sensing 508 works in conjunction with server control 502 to determine when new content is available for distribution. New content sensing 508 may contact, or may be contacted by, an information provider (not pictured) via wireless connection 514. New information may be delivered to new content sensing 508 via any of the aforementioned methods of wireless communication 514 including both long-range and short-range methods. Some examples of this communication may include long-range communication using cellular data communication methods such as GPRS, short-range wireless communication methods that automatically connect server 500 to a local access point, and a manual update of server 500 via wireless NFC device-to-device communication (or by wired communication) initiated by a representative from the information provider.

Server control 502 receives input from input sections 506 and 508 and determines, in view of the provided information, the appropriate content to distribute. The content is then made available via short-range wireless communication 512 to potential client devices 550 that enter the effective transmission range of server 500.

Client 550 may be WCD 100 or another type of wireless communication device. Client 550 either detects the presence of server 500, or is contacted by server 500 via some type of polled-mode inquiry. If user 110 has enabled short-range communications 552, client 550 may download information from server 500. Similar to server 500, client 550 may include context control 555. Context control 555 may receive information from inputs and/or sensors 557 regarding the current condition and/or environment surrounding client 550, and may use this information to control the behavior of the client. For example, user 110 may establish rules to only permit downloads during certain times, to prevent downloads when in certain geographic locations, to limit downloads to access points with a specific ID, restrict downloads when the power or the memory space of the device is low, etc. These rules may cause context control 555 to permit an information download from server 500 to client 550, prevent the downloading of broadcast content 504 to client 550, immediately delete received content 554 due to a rule restriction, etc. If current conditions allow for information to be downloaded, the received content 554 may then be subject to review by a general firewall application. Firewalls are software or hardware applications employed to keep viruses and other malicious programs from corrupting client 550. If the received content 554 is deemed to be "clean," it may then be subject to a filtering application 558. With filter 558, the user may designate that only certain types of content may be retained on client 550. For example, user 110 may only allow subject matter available at a certain time, place or pertaining to a certain subject matter to be downloaded. Exemplary categories might include only retaining information downloaded from 9:00 AM-5:00 PM on weekdays or information pertaining to a certain type of business, such as a sporting goods retailer, clothing retailer, etc. If the information downloaded from server 500 pertains to desired subject matter, it may be retained for viewing by user 110.

User 110 may then use an application, such as view guide 560, to organize the received content 554 for viewing. The view guide may output information to display 562 such as a listing or table of contents for the received content 554. User 110 may experience total satisfaction of their curiosity from the received content 554, or may desire more information on the same or similar topic. To further aid user 110, received content 554 may also include pointers or links 564 to additional information. For example, the received content 554 may include a directory having links to additional files for user 110 to download. Transmitting only a limited-size directory listing from server 500 reduces the total transfer time per client 550, and therefore, increases the amount of clients 550 that might be serviced. User 110 may click on one of the links 564 in order to access additional information via the Internet. If client 550 is an "always connected" device (e.g., a device that always has a live wireless connection to the Internet), a download may start automatically. Alternatively, user 110 may be prompted by client 550 to initiate an online connection to the Internet. These connections may take place using wireless communication 566 over long-range or short-range communication.

Figure 6:
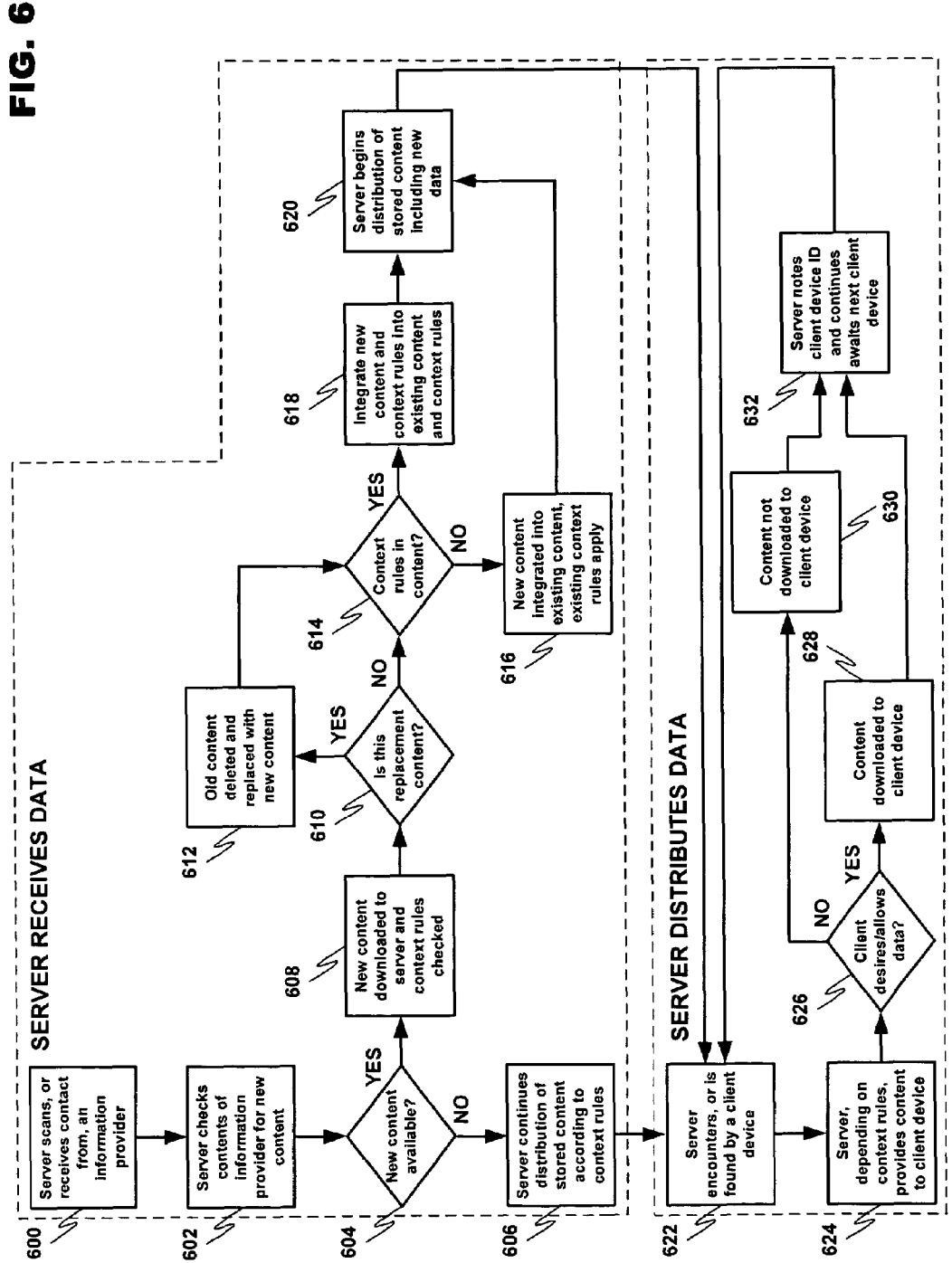
FIG. 6 discloses a flowchart including the process by which a server device receives data and then distributes data in accordance with at least one embodiment of the present invention.

FIG. 6 discloses a flowchart describing the functionality of server 500 both when the server receives updated data to distribute from an information provider, and when it is distributing this data to client 550. In step 600 the server contacts, or is contacted by, an information provider. During this transaction, server 500 determines if new content is available for download from the information provider (step 602). If no new content is available, then server 500 continues to distribute its existing content in step 606. The next contact with the information provider may then be at a set interval, or at a time when an agent of the information provider comes into transmission range of server 500. This may occur at any time over long-range communication, when the public transportation in which server 500 is mounted comes within proximity of a short-range access point, when server 500 is manually updated, etc.

If in step 604 it is determined that new information is available, the content is downloaded to the server and the context rules of the content are checked (step 608). The downloaded content may be a complete replacement for content already existing on server 500. If this is the case, in step 612 the existing content is deleted and replaced with the recently updated information. In step 614, the recently received information is checked to determine if it also contains new context rules. These rules may include, for example, limitations controlling dates or times when the new content may be distributed, a total duration of time for distribution of the new content (e.g., an expiration date), a limit on the number of client devices 550 to receive the information, a specific geographic area in which the new content should be distributed, a certain outside temperature range appropriate for distributing the new content, only distribute the new content when a certain floor is selected (in an elevator), a certain device manufacturer or service provider for client 550 that should receive the new content, etc. These new context rules may be integrated with existing context rules already controlling server 500 in step 618. Otherwise, in step 616 any server-level rules in server 550 may be applied to the new content when it is loaded for distribution. In step 620, the server resumes the distribution of information, now including the newly downloaded content.

The process of information distribution to client devices 550 begins in step 622 wherein server 500 encounters client 550. This transaction may be initiated by either the server or the client, depending on the type of short-range communication employed. In any transaction, server 500 must first refer to the context rules controlling the distribution of the content before it is offered to client 550 in step 624. If distribution is permitted, then the client 550 must determine whether the information is permitted for download. The content may be banned by a context-based rule, a hardware or software firewall, a filter application or other provision for screening information (step 626). If the content is permitted, it is downloaded to client 550 (step 628), alternatively, it is not downloaded in step 630. In step 632, the server 500 and client 550 disconnect. In some instances, the server 500 may record an identification for client 550. This information may be used directly by server 500 to prevent reconnection to the same client, or may be compiled and provided to the information provider during the communication previously described. An information provider may use this information to determine how the content is being distributed, change the context rules of the server and/or content, to determine whether the server should be moved to a new location, etc.

V. Podcast Distribution Embodiment

The present invention is useful for the distribution of all forms of electronic information via short-range wireless communication based on device-level or content-level context rules. A server operating in this system may be mobile, and may adjust its behavior based on sensed environmental conditions. An exemplary application to which the present invention is particularly applicable is the wireless distribution of information pertaining to recently posted podcasts. This information may be utilized by user 110 to browse, select and download a podcast to WCD 100.

Figure 7:
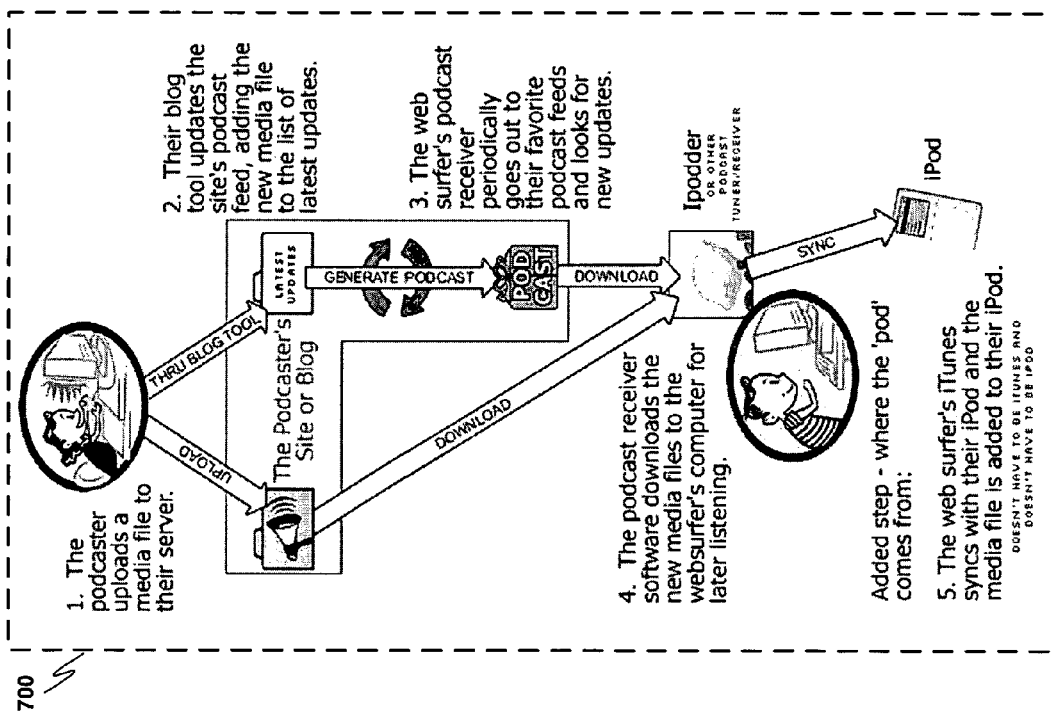
FIG. 7 discloses an exemplary method by which podcasts are created and distributed in accordance with at least one embodiment of the present invention.

FIG. 7 describes a standard process 700 by which a podcast may be created and distributed. In its simplest form, a podcast is a digital recording. The source of the recording may be a radio, television or other media program that is also broadcast live on the air. In other instances, the podcast may be from a entity recording the content specifically for distribution on the Internet. The typical patron may be a person who wished to see the original radio or television version of the recorded program, however, was unable to do so because of work, school, etc. A person may currently obtain podcasts by viewing a source website (e.g., a weblog or "blog") where podcasts are normally made available, and manually checking to see if a new podcast has been posted. However, this process may become cumbersome if the user desires to track multiple podcasts. Instead a podcast "receiver" or "tuner" application may be configured to check multiple websites automatically and download any newly posted content to the computer of user 110. The listener may then partake of these podcasts on the computer, or may download them to a portable device to enjoy at a later time.

The problem with the previously described process is that it requires user 110 to have an alternate device, such as a laptop or desktop computer actively connected to the Internet, to accumulate podcasts before downloading them to a portable listening device. This requirement means that a podcast patron cannot obtain their favorite podcasts on a mobile listening device without the intervening download and transfer step. The present invention may be applied to this situation to alleviate problems in the current process. Not only can the present invention deliver information on desired podcasts directly to a mobile device user 110, but it can also provide information on previously unknown podcast sources that might also be of interest. This benefits both the user and the podcast provider. The user gets immediate notification of new postings that may interest them, and the podcast provider gets enhanced distribution for their recorded content.

Figure 8:
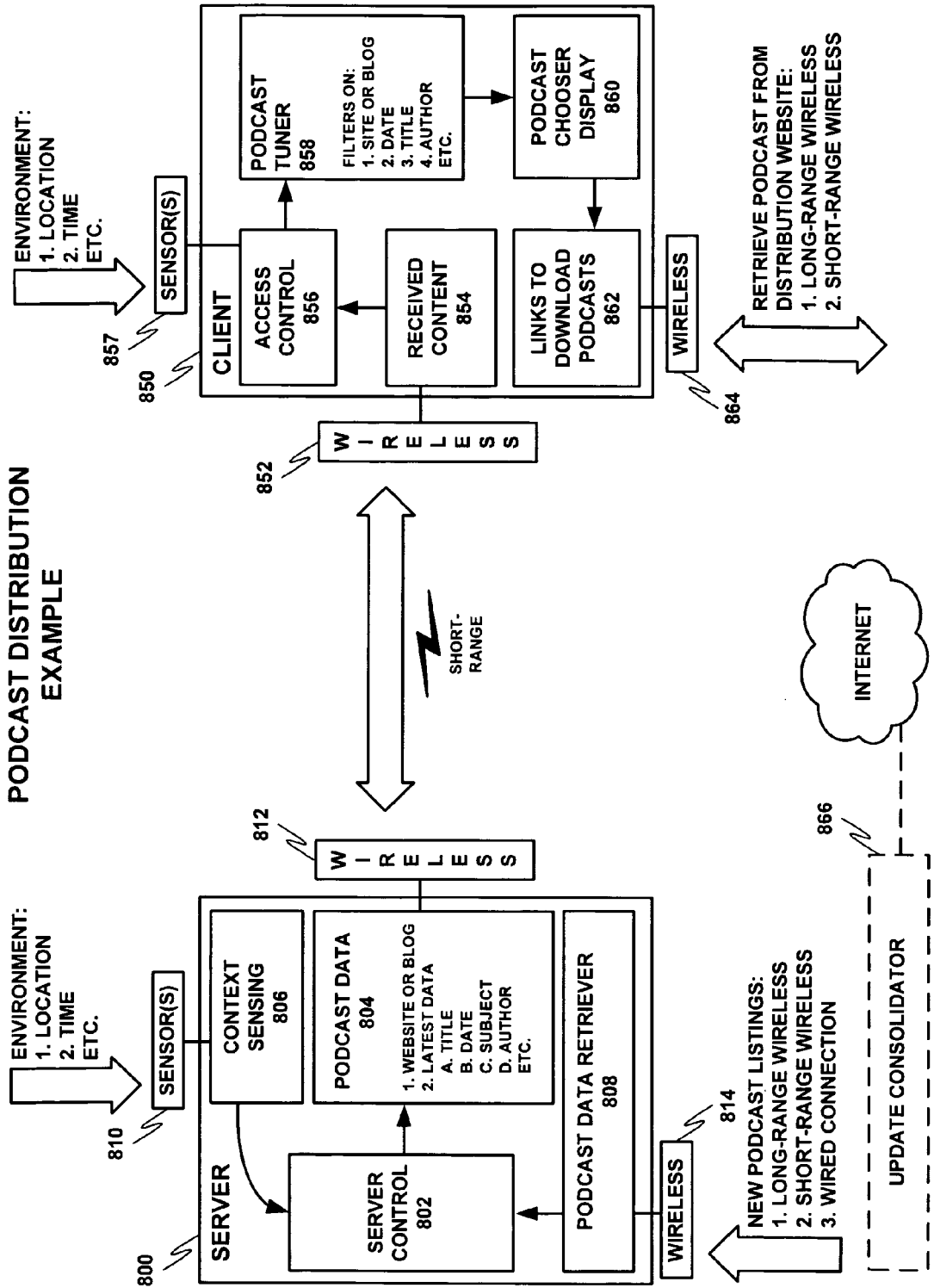
FIG. 8 discloses an exemplary embodiment of the present invention wherein a server device and client device interact in the distribution of podcast information.

FIG. 8 in an exemplary embodiment of the present invention that is similar to FIG. 5, but has been modified to apply to a podcast distribution model. Podcast information server 800 includes server control 802 that receives input from context sensing 806 and podcast data retriever 808. Server control 802 uses this input information to determine how to control the broadcasting of podcast data 804.

Context sensing 806 may be connected to sensors or inputs 810, and may use these elements to determine current environmental conditions. Sensed conditions may included the present location of a server, the current time, the current date, the current temperature, various inputs from the mounting location 400 of server 800, information related to other devices in the area of server 800, current power and memory condition of server 800, etc. This information may be collected context sensing 806, and possibly compiled, before presentation to server control 802.

Podcast data retriever 808 may contact, or be contacted by, an information provider via wireless communication 814. In the present example, an update consolidator 866 may contact the podcast data retriever via the long-range and/or short-range communication methods already provided. The update consolidator may have the ability to search the Internet for podcast providers, and in turn may create a consolidated listing of various podcast providers including when the most-recent podcast was posted. These results may then be communicated to podcast information server 800 for distribution to clients 850. Typical context control data included in the information provided by update consolidator 866 may include a duration for distribution (e.g., expiration date), a geographical limitation (e.g., the consolidator is only licensed to distribute information to a certain geographic area), a client 850 identification limitation, etc. Further updates may be delivered to podcast data retriever 808 on a periodic or as-needed basis.

Server control 802 distributes podcast data 804 based on the inputs from context sensing 806 and podcast data retriever 808. The information distributed may listings for recently posted podcasts, or in some cases, the actual podcasts. The distribution depends on the abilities of server device 800 and the type of short-range communication employed.

Client 850 may receive content 854 via short range wireless communication 852. This transaction may be initiated by either server 800 or client 850. The server may, in some instances, be communicating via Bluetooth™ communication, wherein a piconet is automatically instigated by server 800 including client 850. In this particular embodiment, received content 854 is first checked by access control 856 to verify that all contents are permitted and/or safe for processing. Access control 856 may combine a context control aspect and firewall aspect into an overall download gatekeeper for the device. Access control 856 may, at the time of the download, sense the current environmental conditions surrounding client 850, and determine whether podcast data 804 is permitted for download. If the sensed current conditions comply with the controlling context rules, access control 856 may also simultaneously or soon after check the received content 854 for viruses, spyware, etc. The received content may then be passed to podcast tuner 858 for processing. If received content 854 is a list of newly posted podcasts, tuner 858 may sort the listing according to user preferences indicated in the tuner. More specifically, some of the recently posted podcasts may be from a series frequented by user 110, and therefore when the listing is displayed in podcast chooser display 860, these listings may be highlighted to the user, for instance, as "favorites." Other podcast sources never encountered by user 110 may also be highlighted as being of interest to the user based on a general topic to which they pertain. Further, actual podcasts may be included in received content 854, and these podcasts may be displayed for the user. For example, a podcast providing general availability information on popular recently posted podcasts and newly offered podcasts may inform user 110 via an audio program.

The podcast chooser display 860 may further include links to download actual podcasts 862. These links may be utilized by user 110 when client 850 is wirelessly connected 864 to the Internet. If the device is "always connected," selecting a link 862 may automatically initiate a download of the podcast to client 850. For other types of devices, the selection of a link 862 may prompt the user to establish a live connection to the Internet via wireless connection 864. For this transaction, any of the short-range or long-range communication methods previously discussed may be employed. After the podcast (or podcasts) are downloaded to client 850, user 110 may enjoy these recorded digital programs at their leisure.

Figure 9:
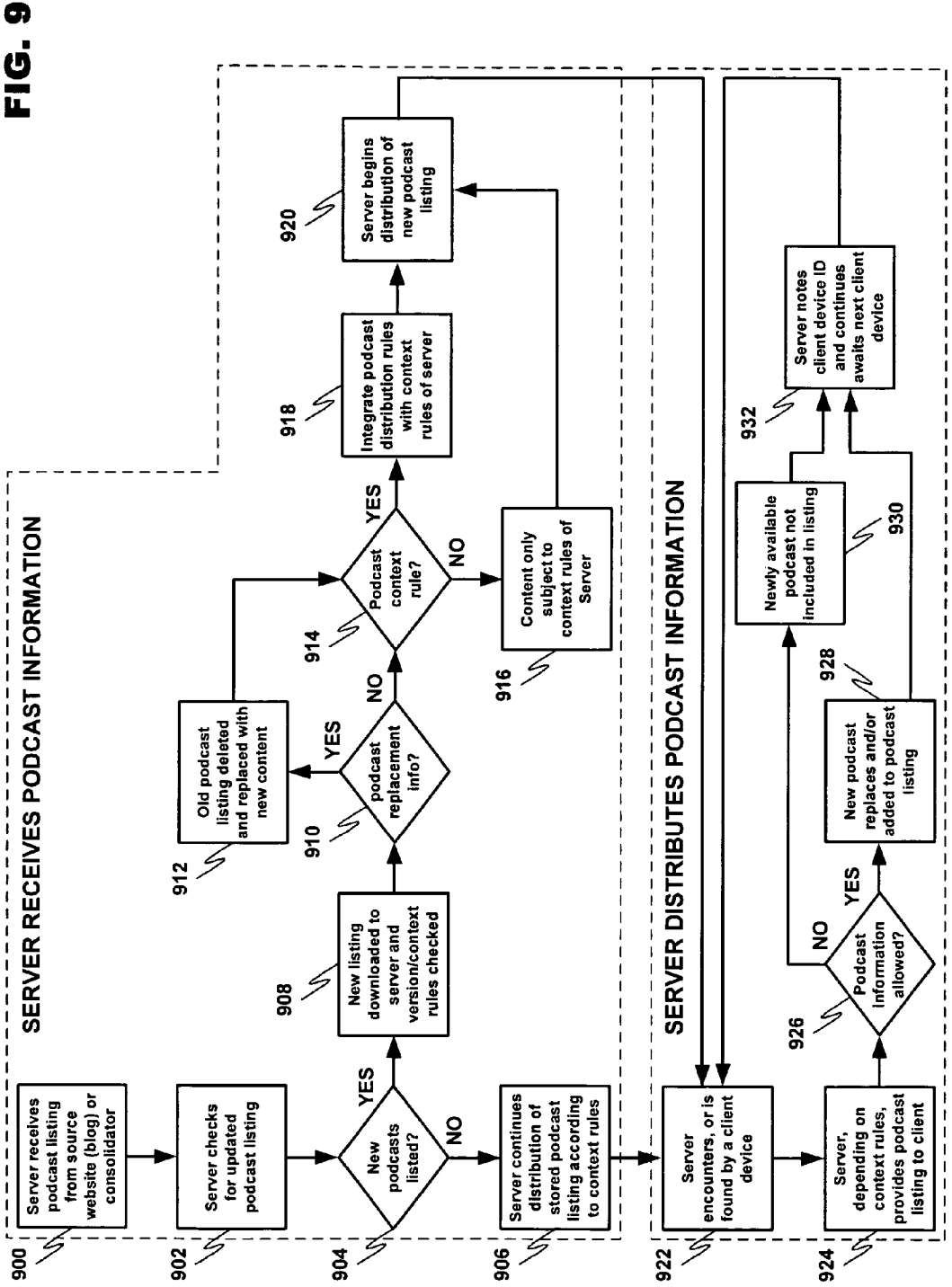
FIG. 9 discloses a flowchart explaining the exemplary embodiment of podcast distribution as disclosed in FIG. 8.

The exemplary process of interaction described in FIG. 8 is disclosed as a flowchart in FIG. 9. In step 900 the podcast server 800 contacts, or is contacted by, an information provider, for example, update consolidator 866. During this initial transaction server 800 inquires as to whether a new podcast listing has been posted by the update consolidator 866 (step 902). If no update has been posted, then the process proceeds to step 906, wherein the server 800 continues to distribute information according to the context rules of the existing content. Alternatively, if an update has been posted (as determined in step 904), the new podcast information is downloaded to server 800 and the content is checked for version information and context rules (step 908). If the recently received content is a complete replacement for the existing podcast information (as determined in step 910) then in step 912 the existing podcast information is replaced with the newly received information. The inquiry into whether there are context rules for the podcast information is performed in step 914. These rules may entail a duration or expiration date for distribution, distribution in only a certain geographic area or only during certain times, distribution to clients made by a specific manufacturer or serviced by a certain service provider, etc. These rules may be integrated with existing server-level or content-level rules in step 918, or if no rules exist, the received content may only be subject to existing server-level rules in step 916. Server 800 may then resume distributing information at step 920, including the newly received podcast information.

At step 922, server 800 contacts, or is contacted by, client device 850. This interaction may be initiated by either device depending on the particular short-range communication technology employed. If prevailing context rules permit, server 800 may distribute podcast information to client 850 at step 924. Client 850 may have an access control (e.g., context control, firewall, filter, etc.) that determines whether the information offered by server 800 is allowed for download. If at step 926 the content is permitted, the downloaded information replaces or supplements the information already present in client 850 (step 928). Alternatively, the information may be rejected, or if the download has already occurred, may then be deleted at a later time in step 930. Regardless of the outcome, the server may record the identification of client 850 at step 932 and may re-enter a distribution mode in preparation for the next client. The client identification may be used by server 800 to prevent reconnections to clients 850 that have already been serviced, or may be provided to an information provider to be used for statistical analysis regarding the numbers and types of clients 850 served.

FIG. 10A discloses a flow chart describing the process that occurs regarding client 850 after a download of podcast information from server 800. In step 1000 the podcast listing is received into client 850. This process assumes that steps 926-930 have already occurred in the device. In step 1020, the podcast listing is assembled from the downloaded information, and displayed on the client. The user may then select a podcast for download in step 1040. If the user wants to download particular content, then in steps 1040-1100 they may choose to download a podcast by selecting a link (as previously described). The selection of a link may cause client 850 to connect to the Internet in step 1080. If the device is "always connected," the download activation may entail a simple prompt to confirm that user 110 really wants to download the podcast. Otherwise, client 800 may request permission to establish a wireless connection with the Internet via any of the long-range or short-range communication methods previously discussed. Alternatively, If user 110 is not currently interested in downloading a podcast, the previously downloaded podcast information may be retained by client 850, and may be reviewed, or deleted manually or automatically at a later time (step 1060).

FIG. 10B discloses exemplary user interfaces for client 850 (e.g., WCD 100). Since a download may occur automatically without the need for user intervention, an visual or audio indicator may be used for notification. In example user interface 1500, user 110 may be involved in other tasks when indicator 1550 indicates that new podcast information has been downloaded. User 110 may then navigate through various menus on client 850 to arrive at podcast tuner user interface 1520. This user interface displays the downloaded podcast information according to user preferences. In this example, the user has updates for three preferred podcasts, and one new podcast has appeared (e.g., NFLWEEK.MP3) from a source not previously patronized by the user. New podcasts may be organized by various characteristics including user preferred topics, etc. After user 110 chooses a podcast to download, download interface 1540 gives user 110 the specific characteristics of the podcast, and verifies that user 110 desires to establish a connection to the Internet in order to download the podcast. Alternatively, if the device is "always connected," permission may be asked for file retrieval.

The present invention is an improvement over conventional information distribution methods because it facilitates the mobile distribution of wireless electronic content according to a control context based on sensed environmental conditions. A mobile server may be installed in a transitory object, such as public transportation, and this server may address a multitude of different clients via short-range communication to perform a variety of transactions. The system especially improves the current situation concerning the distribution of podcast information, because it removes the necessary step, wherein a user has to return to an intermediary "always connected" computer to obtain podcasts, and further facilitates the potential in-transit audience for podcasts to be updated on the availability of newly posted programs which may be obtained via wireless communication for immediate enjoyment.

Accordingly, it will be apparent to persons skilled in the relevant art that various changes in form a and detail can be made therein without departing from the spirit and scope of the invention. This the breadth and scope of the present invention should not be limited by any of the above-described exemplary embodiments, but should be defined only in accordance with the following claims and their equivalents.

What is claimed is:

1. A method, comprising:
   receiving information into a portable distribution device, the information including at least content information for distribution to encountered devices;
   creating distribution rules in the portable distribution device based upon the received information, the distribution rules including parameters controlling at least one of when to permit distribution, where to permit distribution, to whom to permit distribution and what portion of the received information to distribute;
   sensing environmental conditions pertaining to the portable distribution device;
   determining a portion of the received information that is permitted for distribution from the portable distribution device based on the distribution rules and the environmental conditions; and
   distributing the portion of the received information that is permitted for distribution from the portable distribution device via short-range wireless communication.

2. The method of claim 1, wherein the received information further includes context information corresponding to the content information.

3. The method of claim 2, wherein the distribution rules for distributing the content information are derived from the context information.

4. The method of claim 1, wherein the distribution device is configured or adapted to communicate via long-range and short-range wireless communication.

5. The method of claim 1, wherein the distribution device receives information via an automatic download over short-range wireless communication, long-range wireless communication or wired communication.

6. The method of claim 1, wherein the distribution device receives information via a manual download over short-range wireless communication, long-range wireless communication or wired communication.

7. The method of claim 1, wherein the sensed environmental conditions include at least one of current time, current date, current location, current temperature, inputs from the distribution device mounting location and information related to other wireless communication devices in short-range communication range to the distribution device.

8. The method of claim 1, wherein determining a portion of the received information that is permitted for distribution includes comparing conditions set forth in the distribution rules to the sensed environmental conditions.

9. The method of claim 1, wherein communication between the distribution device and other encountered wireless communication devices is initiated by the distribution device.

10. The method of claim 1, wherein communication between the distribution device and other encountered wireless communication devices is initiated by the other devices.

11. The method of claim 1, wherein the received information includes links for obtaining other information.

12. The method of claim 11, wherein the links, when selected, cause a device containing the received information to automatically download the other information from the Internet.

13. The method of claim 1, wherein the received information includes information related to the availability of podcasts.

14. A portable device, comprising:
    a receiver for receiving information into the portable distribution device, the information including at least content information for distribution to encountered devices;
    a computing device for creating distribution rules based upon the received information, the distribution rules including parameters controlling at least one of when to permit distribution, where to permit distribution, to whom to permit distribution and what portion of the received information to distribute;
    sensors for sensing environmental conditions pertaining to the portable distribution device;
    the computing device further determining a portion of the received information that is permitted for distribution from the portable distribution device based on the distribution rules and the environmental conditions; and
    a transmitter for distributing the portion of the received information that is permitted for distribution from the portable distribution device via short-range wireless communication.

15. The device of claim 14, wherein the received information further includes context information corresponding to the content information.

16. The device of claim 15, wherein the distribution rules for distributing the content information are derived from the context information.

17. The device of claim 14, wherein the distribution device is configured or adapted to communicate via long-range and short-range wireless communication.

18. The device of claim 14, wherein the distribution device receives information via an automatic download over short-range wireless communication, long-range wireless communication or wired communication.

19. The device of claim 14, wherein the distribution device receives information via a manual download over short-range wireless communication, long-range wireless communication or wired communication.

20. The device of claim 14, wherein the sensed environmental conditions include at least one of current time, current date, current location, current temperature, inputs from the distribution device mounting location and information related to other wireless communication devices in short-range communication range to the distribution device.

21. The device of claim 14, wherein determining a portion of the received information that is permitted for distribution includes comparing conditions set forth in the distribution rules to the sensed environmental conditions.

22. The device of claim 14, wherein communication between the distribution device and other encountered wireless communication devices is initiated by the distribution device.

23. The device of claim 14, wherein communication between the distribution device and other encountered wireless communication devices is initiated by the other devices.

24. The device of claim 14, wherein the received information includes links for obtaining other information.

25. The device of claim 24, wherein the links, when selected, cause a device containing the received information to automatically download the other information from the Internet.

26. The device of claim 14, wherein the received information includes information related to the availability of podcasts.

27. A computer program product comprising a computer usable medium having computer readable program code embodied in said medium, comprising:

a computer readable program code for receiving information into a portable distribution device, the information including at least content information for distribution to encountered devices;

a computer readable program code for creating distribution rules in the portable distribution device based upon the received information, the distribution rules including parameters controlling at least one of when to permit distribution, where to permit distribution, to whom to permit distribution and what portion of the received information to distribute;

a computer readable program code for sensing environmental conditions pertaining to the portable distribution device;

a computer readable program code for determining a portion of the received information that is permitted for distribution from the portable distribution device based on the distribution rules and the environmental conditions; and a computer readable program code for distributing the portion of the received information that is permitted for distribution from the portable distribution device via short-range wireless communication.

28. The computer program product of claim 27, wherein the received information further includes context information corresponding to the content information.

29. The computer program product of claim 28, wherein the distribution rules for distributing the content information are derived from the context information.

30. The computer program product of claim 27, wherein the distribution device is configured or adapted to communicate via long-range and short-range wireless communication.

31. The computer program product of claim 27, wherein the distribution device receives information via an automatic download over short-range wireless communication, long-range wireless communication or wired communication.

32. The computer program product of claim 27, wherein the distribution device receives information via a manual download over short-range wireless communication, long-range wireless communication or wired communication.

33. The computer program product of claim 27, wherein the sensed environmental conditions include at least one of current time, current date, current location, current temperature, inputs from the distribution device mounting location and information related to other wireless communication devices in short-range communication range to the distribution device.

34. The computer program product of claim 27, wherein determining a portion of the received information that is permitted for distribution includes comparing conditions set forth in the distribution rules to the sensed environmental conditions.

35. The computer program product of claim 27, wherein communication between the distribution device and other encountered wireless communication devices is initiated by the distribution device.

36. The computer program product of claim 27, wherein communication between the distribution device and other encountered wireless communication devices is initiated by the other devices.

37. The computer program product of claim 27, wherein the received information includes links for obtaining other information.

38. The computer program product of claim 37, wherein the links, when selected, cause a device containing the received information to automatically download the other information from the Internet.

39. The computer program product of claim 27, wherein the received information includes information related to the availability of podcasts.

40. An apparatus, comprising:
a short-range wireless receiver for receiving information related to podcast availability;
sensors for sensing environmental conditions pertaining to the wireless communication device;
a computing device for determining whether the information related to podcast availability is permitted for reception in view of the sensed environmental conditions and distribution rules including parameters controlling at least one of when to permit podcast distribution, where to permit podcast distribution, to whom to permit podcast distribution and what portion of the received podcast information to distribute, and if permitted, for organizing the received information related to podcast availability into a user preferred listing;
a display device for displaying the user preferred listing, and for further facilitating the selection of a podcast from the user preferred listing;
a wireless transmitter for transmitting a wireless download request based on the selected podcast; and
a wireless receiver for receiving the selected podcast.

41. A system, comprising:
an information provider;
a portable distribution device;
a client device;
the portable distribution device receiving information from the information provider, the information including at least content information for distribution to encountered devices;
the portable distribution device creating distribution rules based upon the information received from the information provider, the distribution rules including parameters controlling at least one of when to permit distribution, where to permit distribution, to whom to permit distribution and what portion of the received information to distribute;
the portable distribution device sensing current environmental conditions;
the portable distribution device determining a portion of the received information that is permitted for distribution from the portable distribution device to the client device based on the distribution rules and the current environmental conditions;
the portable distribution device distributing the portion of the received information that is permitted for distribution via short-range wireless communication;
the client device sensing current environmental conditions; and
the client device determining whether the distributed information is permitted for reception in view of the sensed environmental conditions.

* * * * *